US007372852B2

(12) United States Patent
Ghobadian (10) Patent No.: US 7,372,852 B2
(45) Date of Patent: May 13, 2008

(54) INTEGRATED CIRCUIT CAPABLE OF BALANCING SWITCH TRANSITIONS

(75) Inventor: Farzad Ghobadian, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 11/000,020

(22) Filed: Nov. 30, 2004

(65) Prior Publication Data

US 2006/0116101 A1 Jun. 1, 2006

(51) Int. Cl.
*H04L 12/50* (2006.01)
(52) U.S. Cl. .............. 370/362; 370/360; 370/333; 370/389
(58) Field of Classification Search ................ 370/362, 370/360, 333, 389
See application file for complete search history.

(56) References Cited

U.S. PATENT DOCUMENTS

| 6,590,432 | B1 * | 7/2003 | Wu et al. ................. 327/108 |
| 2003/0012186 | A1 * | 1/2003 | Rowe et al. .............. 370/362 |
| 2004/0100944 | A1 * | 5/2004 | Richmond et al. ......... 370/360 |
| 2005/0036485 | A1 * | 2/2005 | Eilers et al. .............. 370/389 |
| 2005/0102549 | A1 * | 5/2005 | Davies et al. ............. 714/4 |

OTHER PUBLICATIONS

PCI Express Base Specification Revision 1.0, Jul. 22, 2002, 15 pgs.
PCI-X Addendum to the PCI Local Bus Specification Revision 1.0a, Jul. 24, 2000 PCI Special Interest group, 9 pgs.
American National Standard: For Information Technology-Fibre Channel-Physical and Signalling Interface-3 (FC-PH-3) Developed by Incits, 1998, 6 pgs.
Serial AT: High Speed Serialized AT Attachment: Revision 1.0a Jan. 7, 2003, APT Technologies, Inc., Dell Computer Corporation, IBM Corporation, Intel Corporation, Maxtor Corporation, Seagate Corporation, 9 pgs.
Information Technology—Serial Attached SCSI—1.1 (SAS-1.1), Working Draft American National Standard: Project T10/1601-D Revision 1, Sep. 18, 2003, 24 pgs.
Serial ATA II: Extensions to Serial ATA 1.0a Revision 1.2, Aug. 27, 2004, 4 pgs.

\* cited by examiner

*Primary Examiner*—Sanh Phu
(74) *Attorney, Agent, or Firm*—Grossman, Tucker, Perreault & Pfleger, PLLC (57) ABSTRACT

A method according to one embodiment may include controlling, by an integrated circuit, a first plurality of switches to generate a first output signal having a first amplitude and a second amplitude and a second plurality of switches to generate a second output signal having a third amplitude and the second amplitude. The method according to this embodiment may also include balancing, by the integrated circuit, the number of switch transitions of said first and second plurality of switches when said first and second output signals go from said first and third amplitudes to said second amplitude, respectively. Of course, many alternatives, variations, and modifications are possible without departing from this embodiment.

35 Claims, 5 Drawing Sheets

INTEGRATED CIRCUIT CAPABLE OF BALANCING SWITCH TRANSITIONS

FIELD

The present disclosure relates to an integrated circuit capable of balancing switch transitions.

BACKGROUND

In one conventional data storage arrangement, a computer node includes a host bus adapter (HBA). The HBA communicates with a data storage system via one or more communication links using a communication protocol associated with the data storage system. The HBA may transmit a serial stream of data to one or more target devices, and the amplitude of the serial data stream may be selected by the communications protocol. In the conventional system, a large number of switches are employed to produce the serial data stream, and the data stream can go from a data transmission state to an idle state. Also, a number of switches must switch states to transition between the data transmission state and the idle state. One convention system employs inverters to invert the switches when transitioning between the data transmission state and the idle state, however, this may result in an unbalance in switch states, which may operate to introduce noise in the serial data stream. The conventional system is incapable of balancing switch transitions, and thus the conventional system is incapable of reducing noise in the serial data stream associated with unbalanced switch transitions without introducing complex noise-reduction circuitry.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
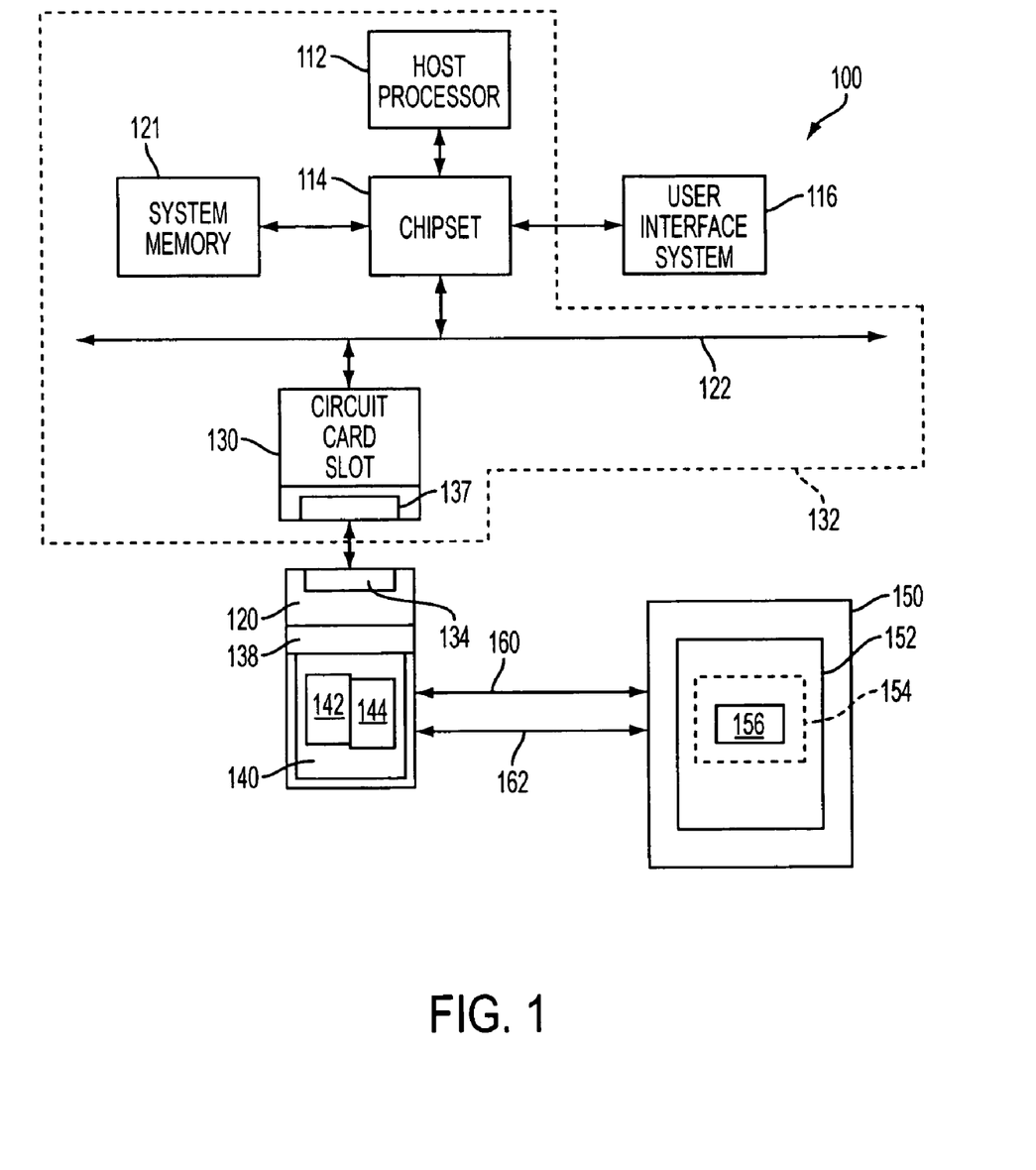
FIG. 1 is a diagram illustrating a system embodiment.

FIG. 1 illustrates a system embodiment 100 of the claimed subject matter. The system 100 may generally include a host system 132 which may include a host processor 112, a bus 122, a user interface system 116, a chipset 114, system memory 121, a circuit card slot 130, and a circuit card 120 that is capable of communicating with the mass storage 150. The host processor 112 may include any variety of processors known in the art such as an Intel® Pentium® IV processor commercially available from the Assignee of the subject application. The bus 122 may include various bus types to transfer data and commands. For instance, the bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may also comply with the PCI-X Specification Rev. 1.0a, Jul. 24, 2000, available from the aforesaid PCI Special Interest Group, Portland, Oreg., U.S.A. (hereinafter referred to as a "PCI-X bus").

The user interface 116 may include a variety of devices for human users to input commands and/or data and to monitor the system such as a keyboard, pointing device, and video display. The chipset 114 may include host bridge/hub system (not shown) that couples the processor 112, system memory 121, and user interface system 116 to each other and to the bus 122. Chipset 114 may include integrated circuit chips, such as those selected from integrated circuit chipsets commercially available from the assignee of the subject application (e.g., graphics memory and I/O controller hub chipsets), although other integrated circuit chips may also, or alternatively be used. The processor 112, system memory 121, chipset 114 and circuit card slot 130 may be integrated onto a motherboard. The processor 112, system memory 121, chipset 114 and circuit card slot 130 may comprise a host system 132.

The circuit card 120 may be constructed to permit it to be inserted into slot 130. When the circuit card 120 is properly inserted into slot 130, connectors 134 and 137 become electrically and mechanically coupled to each other. When connectors 134 and 137 are so coupled to each other, the card 120 becomes electrically coupled to bus 122 and may exchange data and/or commands with system memory 121, host processor 112, and/or user interface system 116 via bus 122 and chipset 114. Alternatively, without departing from this embodiment, the operative circuitry of the circuit card 120 may be included in other structures, systems, and/or devices. These other structures, systems, and/or devices may be, for example, in the motherboard 132, coupled to the bus 122. Processor 112, system memory 121, chipset 114, bus 122, and circuit card slot 130 may be comprised in a single circuit board. Alternatively, and without departing from this embodiment, circuit card 120 may comprise one or more chipsets comprised in a system motherboard.

The circuit card 120 may communicate with mass storage 150 using a plurality of communication protocols. Circuit card 120 may comprise a host bus adaptor (HBA) which may be capable of exchanging commands and data between processor 112 and mass storage 150. The circuit card 120 may comprise at least one integrated circuit 140 capable of initiating communication between the host system 132 and mass storage 150. As used in any embodiment herein, an "integrated circuit" means a semiconductor device and/or microelectronic device, such as, for example, but not limited to, a semiconductor integrated circuit chip.

The circuit card 120 may also comprise memory 138. Memory 138 may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 138 may comprise other and/or later-developed types of computer-readable memory. Machine-readable firmware program instructions may be stored in memory 138. As described below, these instructions may be accessed and executed by integrated circuit 140. When executed by integrated circuit 140, these instructions may result in integrated circuit 140 performing the operations described herein as being performed by integrated circuit 140. Additionally, and as will be described in more detailed below, memory 138 and/or other memory (not shown) may be capable of storing data which may be associated with the operation of integrated circuit 140.

If a Fibre Channel (FC) protocol is used by circuit card 120 to exchange data and/or commands with mass storage 150, it may comply or be compatible with the interface/protocol described in "ANSI Standard Fibre Channel Physical and Signaling Interface-3 X3.303:1998 Specification." Alternatively or additionally, if a Serial ATA (SATA) protocol is used by controller circuit card 120 to exchange data and/or commands with mass storage 150, it may comply or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group and/or earlier and/or later published versions of the SATA standard. Further alternatively or additionally, if a Serial Attached Small Computer System Interface (SAS) protocol is used by controller circuit card 120 to exchange data and/or commands with mass storage 150, it may comply or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard.

Circuit card 120 may be coupled to mass storage 150 via one or more network communication links 160, 162. In this embodiment, mass storage 150 may comprise, e.g., one or more redundant arrays of independent disks (RAID) 152. RAID 152 may comprise, for example, one or more disk mass storage devices and/or one or more peripheral devices (collectively shown in FIG. 1 by the block referred to by numeral 156) comprised in a protocol domain 154. As used herein, "protocol domain" means one or more apparatus that may communicate in accordance with a communication protocol. Also, in this embodiment, communication links 160 and 162 may comprise a differential pair communication data transmission link, which in combination may be capable of communicating commands and/or data from integrated circuit 140 to mass storage 150.

Integrated circuit 140 may comprise protocol initiator circuitry 142 ("initiator circuitry 142"). As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry may be embodied as, and/or form part of, one or more integrated circuits. In this embodiment, initiator circuitry 142 may exchange commands and/or data with mass storage 150, via links 160 and 162, using, for example SATA protocol, SAS protocol and/or FC protocol.

Integrated circuit may also comprise transmit circuitry 144. Transmit circuitry 144 may be capable of generating one or more signals in accordance a protocol used by initiator circuitry. For example, transmit circuitry 144 may be capable of generating at least one output signal having an amplitude that complies or is compatible with the aforementioned SAS, SATA and/or FC communication protocols. At least one output signal generated by transmit circuitry 144 may comprise command and/or data signals and may be transmitted to mass storage 150 via communication links 160 and/or 162.

Figure 2:
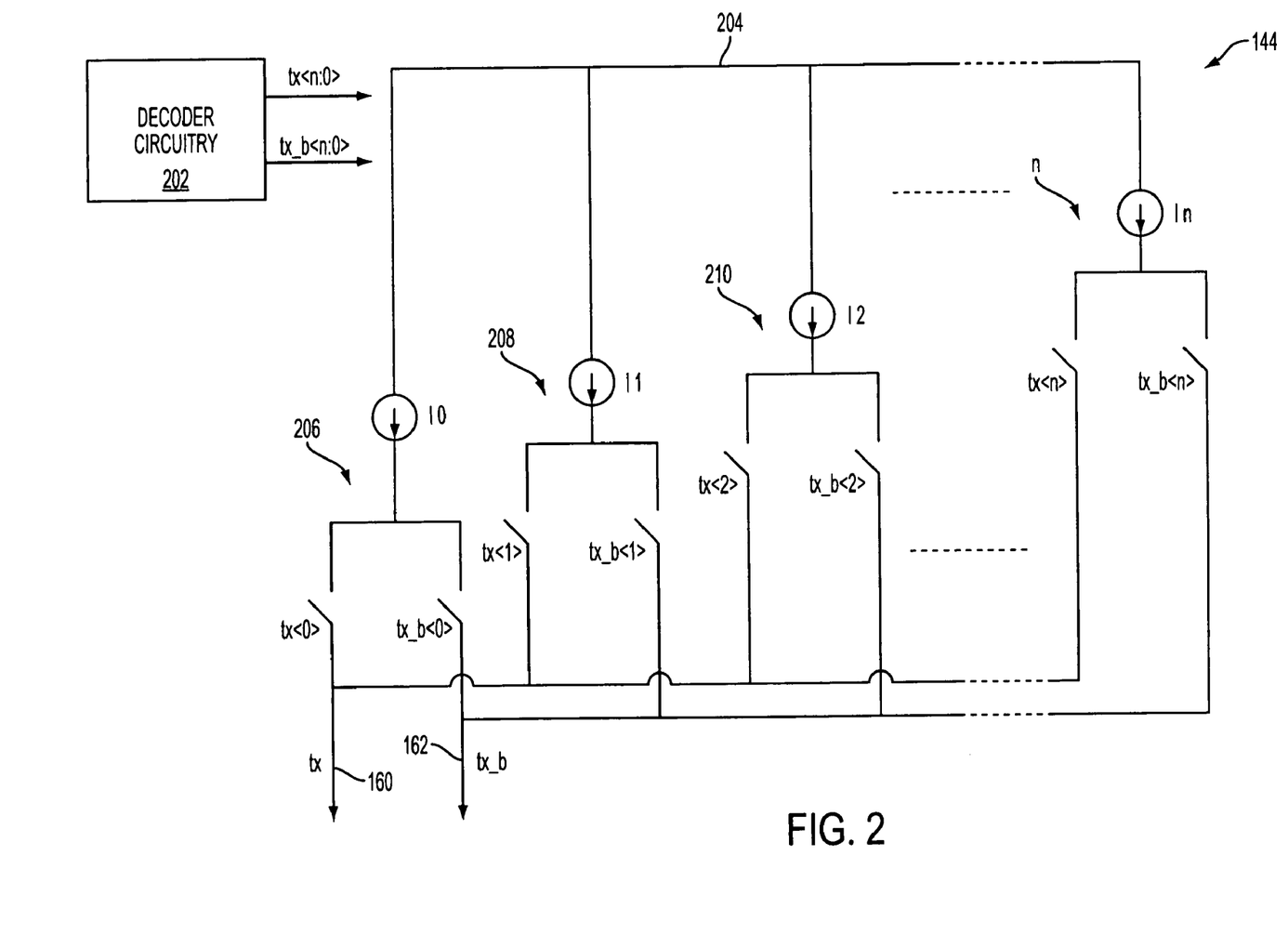
FIG. 2 is a diagram illustrating exemplary transmit circuitry according to one embodiment.

FIG. 2 illustrates exemplary transmit circuitry 144 according to one embodiment. In FIG. 2, certain portions of the system 100 depicted in FIG. 1 have been omitted for clarity (for example circuit board 132 and circuit card 120), but it is to be understood that like parts of FIG. 2 can be implemented in a manner consistent with an embodiment depicted in FIG. 1, or alternatively in other system implementations, without departing from this embodiment. Transmit circuitry 144 may comprise decoder circuitry 202 and differential signal generating circuitry 204. Differential signal generating circuitry 204 may be capable of generating at least one output signal, which may include differential output signals tx (160) and tx_b (162), which may represent a complementary pair of differential binary signals. In this embodiment, differential signal generating circuitry 204 may comprise a plurality of differential circuits, for example, 206, 208, 210, . . . , n. Each differential circuit may comprise a current source (e.g., I 0, I 1, I2, . . . , I n) and a pair of switches, designated tx<0>, tx_b<0> for differential circuit 206, tx<1>, tx_b<1> for differential circuit 208, tx<2>, tx_b<2> for differential circuit 210 and tx<n>, tx_b<n> for differential circuit n. "Switch" as used in any embodiment herein may comprise circuitry capable of changing conduction states and may include, for example, at least one field-effect transistor (FET) and/or bi-polar junction transistor (BJT). In this embodiment, the current source may be equally weighted (i.e., each current source may generate approximately the same current), and differential circuits 206, 208, 201, . . . , n may comprise identical circuitry.

The tx switches (i.e., switches tx<0>, tx<1>, tx<2>, . . . , tx<n>) may be coupled together and the outputs thereof may be summed to form the tx signal 160. Likewise, the tx_b switches may be coupled together and the outputs thereof may be summed to form the tx_b signal 162. By convention, as used in an embodiment herein, the difference between tx and tx_b may produce a binary "1" (i.e., tx−tx_b=1), and the difference between tx_b and tx may produce a binary "0" (i.e., tx_b−tx =0), although it is equally contemplated in alternative embodiments herein that the reverse may be true, i.e., tx−tx_b=0 and tx_b−tx=1. Also, by convention, in any embodiment herein, an open switch may be designated as a 0, while a closed switch (closed meaning the switch provides a conduction path for respective current sources comprised in differential circuits) may be designated as a 1 (although it is equally contemplated in alternative embodiments that the reverse may be true, i.e., an open switch may be designated as a 1, and a closed switch may be designated as a 0). The amplitude of the tx and tx_b signals may be based on the number of respective tx and tx_b switches that are closed. The number of differential circuits 206, 208, 210, . . . , n provided by the differential signal generating circuitry 204 may be based on, for example, a desired amplitude granularity for an application or set of applications.

Figure 3:
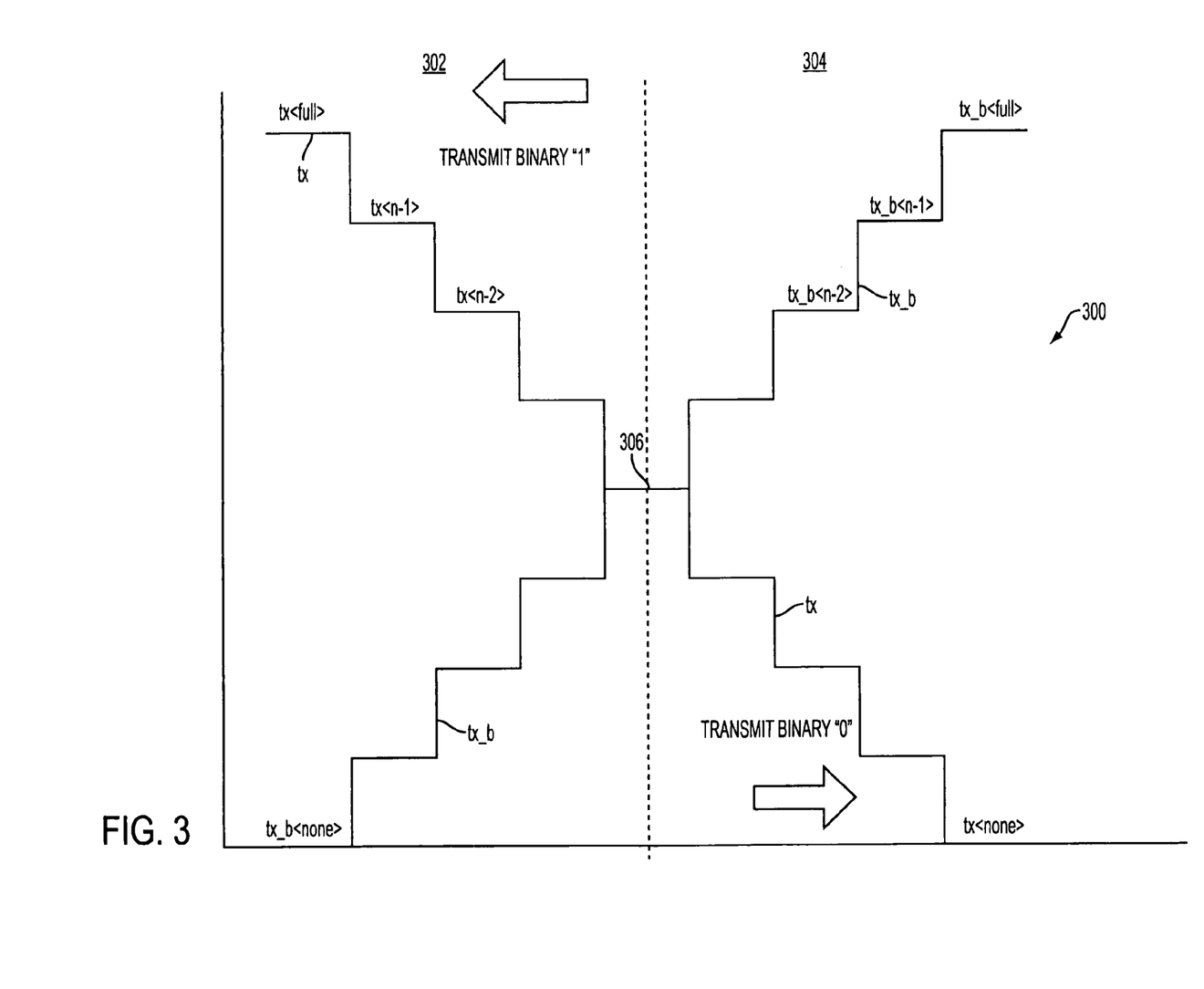
FIG. 3 is a diagram illustrating exemplary output signals of the exemplary transmit circuitry of FIG. 2.

FIG. 3 depicts a graphical representation of exemplary tx and tx_b signals 300 which may be generated according to an embodiment. Taken in conjunction with FIG. 2 (and the description thereof), in this example, the "y" axis represents current amplitude I and the "x" axis represents time. As depicted, the tx signal can assume a plurality of amplitude values, which may be based on the number of differential circuits and the number of closed tx switches. For example, if all of the tx switches are closed, the amplitude of the tx signal, represented by "tx<full>" in the figure, may represent a maximum current value that may be generated by the differential signal generating circuitry 204. Following this example, if (n-1) of the tx switches are closed, the amplitude of the tx signal 160 may be represented by tx<n-1>. The amplitude of the tx signal may be generated to have a plurality of amplitudes, as depicted, including a minimum amplitude, represented by tx<none>, which may result when none of the tx switches are closed. Similarly, the amplitude of the tx_b signal may be generated to have a plurality of amplitudes, for example, ranging from a minimum amplitude represented by tx_b<none> (which may result when none of the tx_b switches are closed), to a maximum amplitude represented by tx_b<full> (which may result when all of the tx_b switches are closed).

In this embodiment tx and tx_b may comprise complimentary signals. As depicted in FIG. 3, a binary "1" may be transmitted when the amplitude of tx is greater than tx_b (i.e., tx >tx_b). A binary "0" may be transmitted when the amplitude of the tx_b signal is greater than the tx signal (i.e., tx_b>tx). When tx=tx_b, depicted graphically in FIG. 3 by numeral 306, an idle state may occur, and may represent a transition between binary values. Idle state 306 may represent approximately a midpoint between an upper amplitude of the tx signal and a lower value of the tx signal, and may be generated when the number of open tx switches approximately equals the number of closed tx switches. Similarly, idle state 306 may represent approximately a midpoint between an upper amplitude of the tx_b signal and a lower value of the tx_b signal, and may be generated when the number of open tx_b switches approximately equals the number of closed tx_b switches. Idle state 306 may also be called "squelch", and such terms may be used interchangeably herein.

As stated previously, the amplitude of a binary "1" may be represented by tx–tx_b, and the amplitude of a binary "0" may be represented by tx_b–tx. Also, in this embodiment, current sources, generating respective amplitude values for the tx and tx_b signals, may be equally weighted, and thus, any of the tx and/or tx_b switches may be used to generate a selected amplitude.

Referring again to the exemplary embodiment of FIG. 2, and as stated herein, transmit circuitry 144 may comprise decoder circuitry 202. Decoder circuitry 202 may be capable of generating one or more control signals to control the conduction state of one or more tx switches, represented by tx<n:0>. Similarly, Decoder circuitry 202 may be capable of generating one or more control signals to control the conduction state of one or more tx_b switches, represented by tx_b<n:0>. As used in any embodiment herein, "conduction state", may comprise an open condition (non-conducting) and/or a closed condition (conducting). In one embodiment, tx control signals (tx<n:0>) and/or tx_b control signal (tx_b<n:0>) may be generated by decoder circuitry 202 independently of each other. In at least one embodiment herein, decoder circuitry 202 may be capable of balancing the number of tx and tx_b switches that may change conduction states when transitioning between binary values, for example, when transitioning from a binary "1" to a binary "0" and/or when transitioning from a binary "0" to a binary "1".

Figure 4A:
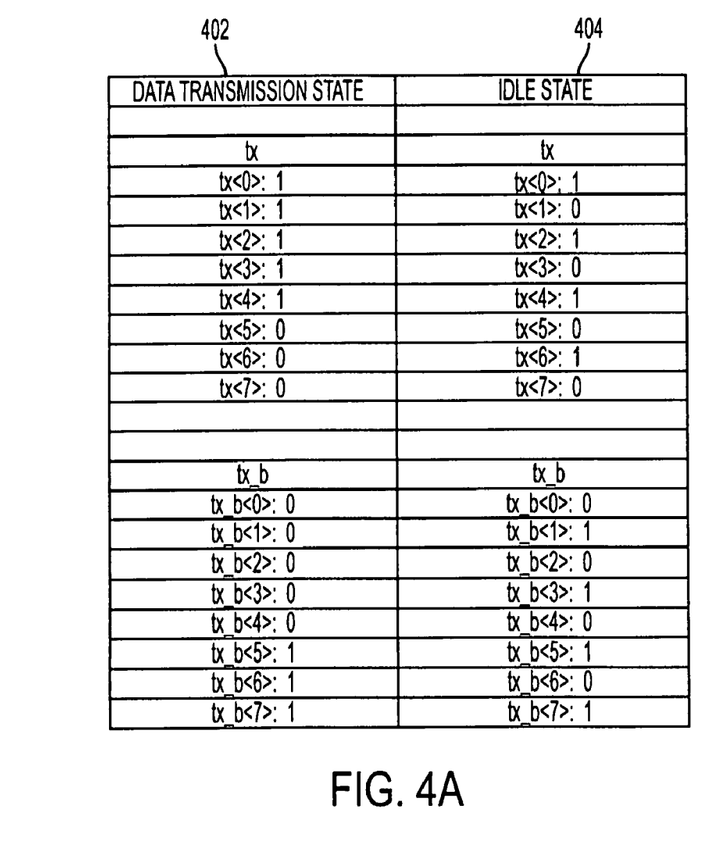
FIG. 4A is a table of exemplary bit values for binary signal transmission of the exemplary transmit circuitry of FIG. 2.
Figure 4B:
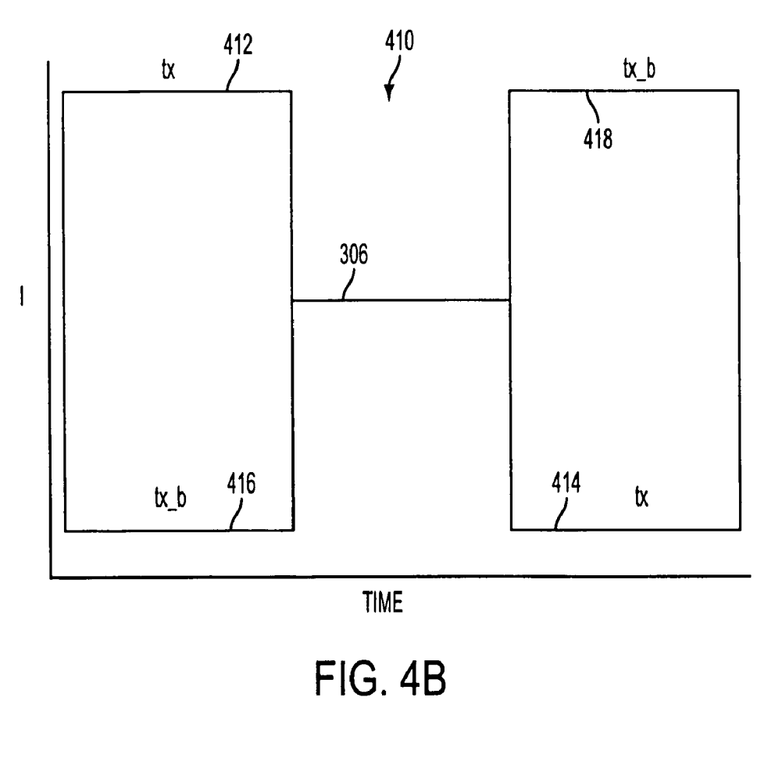
FIG. 4B is a diagram illustrating exemplary output signals of the exemplary transmit circuitry of FIG. 2 according to another embodiment.

FIG. 4A depicts an exemplary table 405 of operations of differential transmit circuitry 144 according to an embodiment, and FIG. 4B depicts an exemplary graph of tx and tx_b signals which may be generated according to the operations of FIG. 4A. In this example, assume that differential signal generating circuitry 204 may include eight differential circuits, and that each differential circuit includes eight respective tx switches (tx<0>, tx<1>, tx<2>, tx<3>, tx<4>, tx<5>, tx<6> and tx<7>) and eight respective tx_b switches (tx_b<0>, tx_b<1>, tx_b<2>, tx_b<3>, tx_b<4>, tx_b<5>, tx_b<6> and tx_b<7>). Also, assume that each respective differential circuit may generate equally weighted amplitude values that when summed together may produce respective tx and tx_b signals. Although this example depicts eight differential circuits, it is to be understood that the present embodiment may include any number of differential circuits, and that eight differential circuits are only provided for clarity in understanding operations according to this embodiment.

In this embodiment, and as depicted in FIG. 4B, transmit circuitry 144 may be capable of generating a tx signal that may swing from an upper amplitude 412 to a lower amplitude 414. Similarly, transmit circuitry 144 may be capable of generating a tx_b signal that may swing from a lower amplitude 416 to an upper amplitude 418. When the tx and/or tx_b signals are at respective upper and/or lower amplitudes, this may represent a "data transmission" state of the transmit circuitry 144. "Data transmission" as used herein, may be defined as a state in which transmit circuitry 144 is transmitting commands and/or data. For example, the tx signal at the upper amplitude 412 and the tx_b signal at the lower amplitude 416, taken together, may represent data transmission of a binary value (e.g., tx–tx_b which may represent a binary "1" or a binary "0"). Similarly, the tx_b signal at the upper amplitude 418 and the tx signal at the lower amplitude 414, taken together, may represent data transmission of a binary value (e.g., tx_b–tx which may represent a binary "0" or a binary "1").

In this exemplary embodiment, transmit circuitry 144 may be capable transitioning the conduction state of one or more tx and/or tx_b switches to at least one signal that is capable of going from a data transmission state to an idle state. For example, and as depicted in FIG. 4B, the tx signal may swing from an upper amplitude 412 to an idle state 306 for predetermined time period. Similarly, the tx_b signal may swing from a lower amplitude 416 to an idle amplitude state 306. Of course, from the idle amplitude state 306, the tx and/or tx_b signals may also swing to a lower and/or upper amplitude, for example, from the idle state 306 the tx signal may swing to a lower amplitude 414 and/or the tx_b signal may swing to an upper amplitude 418. The idle state 306 may represent a signal having an amplitude that may be between the upper and lower amplitude of the tx and/or tx_b signals. In this embodiment, the idle state 306 may represent a signal that may be approximately the midpoint amplitude between the upper and lower amplitude of the tx and/or tx_b signals. Although in this embodiment the amplitude value for the idle states 306 of the tx and tx_b signals are equal, alternatively or additionally, the amplitude of the idle state of the tx signal may be different than the amplitude of the idle state of the tx_b signal without departing from this embodiment.

The left column 402 of table 405 may represent the conduction states of eight respective tx and tx_b switches which, in combination, may represent one exemplary "data transmission state" of the transmit circuitry 144. In this example, the amplitude of the tx signal during one exemplary data transmission state may be determined by the conduction states of tx switches tx<0>, tx<1>, tx<2>, tx<3> and tx<4>. In this example, the "1" next to these switches in FIG. 4A may represent a closed, or conducting switch, while a "0" next to these switches tx<5>, tx<6> and tx<7> may represent an open or non-conducting switch. Similarly, the amplitude of the tx_b signal during this exemplary data transmission state may be determined by the conduction states of tx_b switches tx_b<5>, tx_b<6> and tx_b<7> (and similarly in this example, the "1" next to these switches in FIG. 4A may represent a closed, or conducting switch, and a "0" next to switches tx_b<0>, tx_b<1>, tx_b<2>, tx_b<3> and tx b<4> may represent an open or non-conducting switch.) Thus, in this example, the tx signal may have a greater amplitude than the tx_b signal, as may be graphically shown in FIG. 4B by reference numerals 412 and 416, respectively. These amplitudes of the tx and tx_b signals are only exemplary, and in this example, any of the tx and/or tx_b switches may be controlled to generate one or more desired amplitudes for the tx and/or tx_b signals.

In this embodiment, when the tx and tx_b signals transition from a data transmission state (column 402) to an idle state (column 404), decoder circuitry 202 may be capable of balancing the number of switch transitions of the tx and tx_b switches generating the tx and tx_b signals. "Switch transition", as used in any embodiment herein, may be defined as a switch going from closed conduction state to an open conduction state and/or a switch going from an open conduction state to a closed conduction state. "Balancing", as used in any embodiment herein with respect to switch transitions of the tx and tx_b switches of the transmit circuitry 144, may be defined as switching the conduction state of approximately the same number of switches when transitioning the conduction state of one or more tx and tx_b switches from a data transmission state to an idle state and/or transitioning from an idle state to a data transmission state. "Approximately the same number", as used in the aforementioned definition of balancing, shall not be construed herein as meaning only an equal number switch transitions of the tx and tx_b switches (although this definition is fully contemplated herein), but rather, may alternatively or additionally mean that the number of tx and tx_b switch transitions may not be equal. Alternatively or additionally, "approximately the same number", as used in the definition of "balancing", may comprise a number of switch transitions of tx and tx_b switches that satisfies a noise threshold and/or noise tolerance that may be generated when an unbalanced number of tx and tx_b switches transition from a data transmission state to an idle state.

Thus, for example, in the exemplary table of FIG. 4A, the tx switches in the data transmission state (column 402) may switch to an idle state (column 404) and similarly the tx_b switches in the data transmission state (column 402) may switch to an idle state (column 404). In this example, the idle state (column 404) for both the tx and tx_b signals may comprise a signal state where half of the tx and tx_b switches may be closed (conducting) and the other half of the tx and tx_b switches may be open (non-conducting). As stated, and in this embodiment, decoder circuitry 202 may be capable of balancing the number of switch transitions of the tx and tx_b switches between the data transmission state and the idle state. In this example, decoder circuitry 202 may control switches tx<1>, tx<3> and tx<6> to change states between the data transmission state (column 402) and the idle state (column 404), for a total of three (3) switch transitions. Also, decoder circuitry 202 may control switches tx_b<1>, tx_b<3> and tx_b<6> to change states between the data transmission state (column 402) and the idle state (column 404), also for a total of three (3) switch transitions. Thus, the number of switch transitions between the tx and tx_b switches may be balanced. As stated, "balanced" does not necessarily mean equal, and therefore the foregoing is provided only as an example, and an unequal number of switch transitions between the tx and tx_b switches is fully contemplated by this embodiment.

Figure 5:
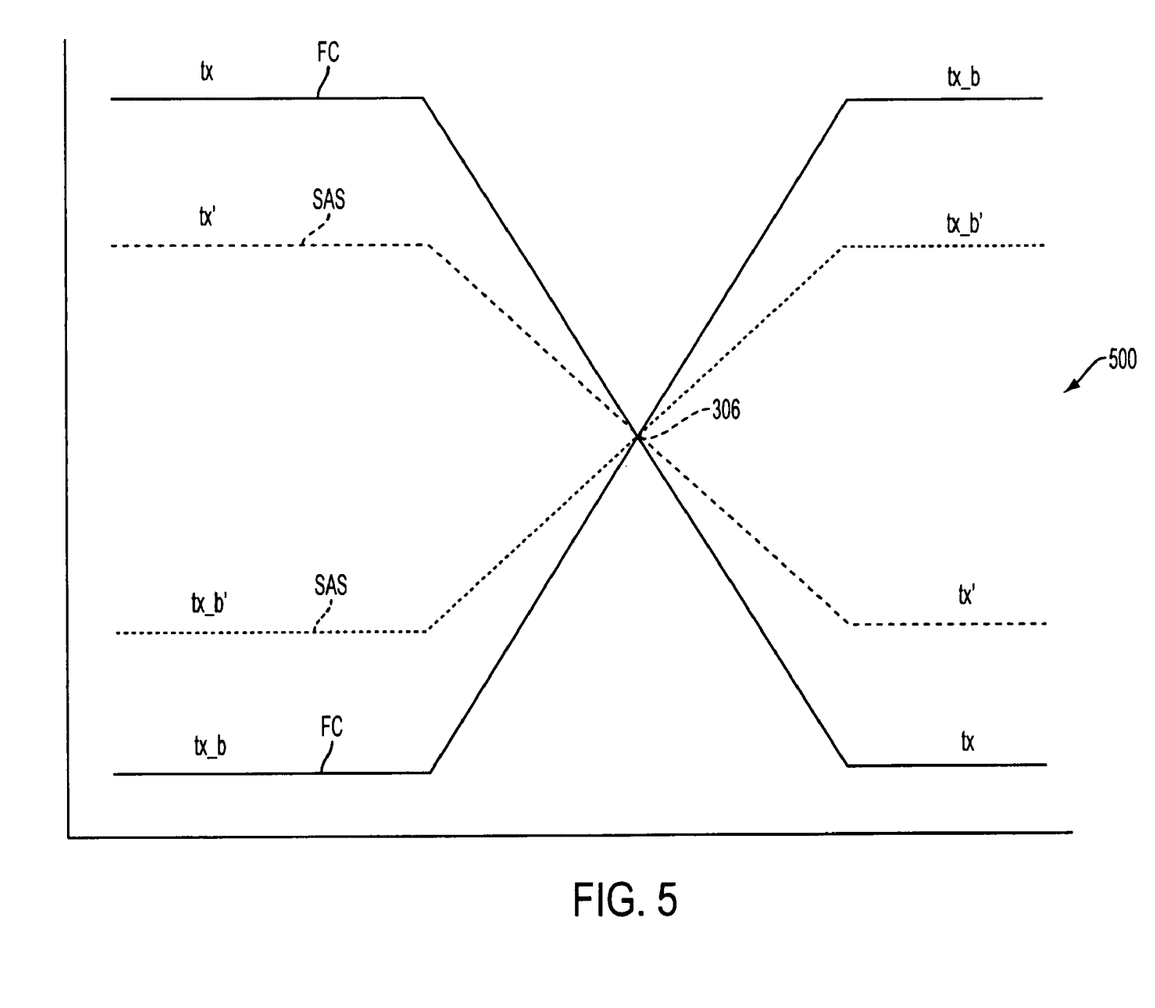
FIG. 5 is a diagram illustrating exemplary output signals of the exemplary transmit circuitry of FIG. 2 according to another embodiment.

As stated, transmit circuitry 144 may be capable of generating one or more signals in accordance with a protocol used by initiator circuitry 142. For example, FIG. 5 is a diagram illustrating exemplary output signals 500 of the exemplary transmit circuitry of FIG. 2 according to another embodiment. In this example, transmit circuitry 144 may be capable of generating a plurality of complimentary tx and tx_b signals, which may form part of a serial data stream, and each may have an amplitude that complies or is compatible with the aforementioned SAS and/or FC communication protocols. In this example, the FC communications protocol may specify complimentary signals having a greater differential amplitude than the SAS communications protocol. In this example, the idle state 306 for the tx and tx_b signals is depicted as approximately between the tx and tx_b amplitude values.

Thus, one embodiment disclosed herein may provide an integrated circuit that may be capable of controlling a first plurality of switches to generate a first output signal having a first amplitude and a second amplitude and a second plurality of switches to generate a second output signal having a third amplitude and the second amplitude. The integrated circuit may be further capable of balancing the number of switch transitions of the first and second plurality of switches when the first and second output signals go from the first and third amplitudes to the second amplitude, respectively.

A system embodiment disclosed herein may provide a circuit card comprising an integrated circuit capable of communicating in accordance with a plurality of different communication protocols. The circuit card may be capable of being coupled to a bus. The integrated circuit may be further capable of controlling a first plurality of switches to generate a first output signal in accordance with at least one of the communications protocol, the first output signal having a data transmission state and an idle state, and a second plurality of switches to generate a second output signal in accordance with at least one of the communications protocol, the second output signal having a data transmission state and an idle state. The integrated circuit may be further capable of balancing the number of switch transitions of the first and second plurality of switches when the first and second output signals go from the data transmission state to the idle state, respectively.

The integrated circuit of these embodiments may offer enhanced capabilities. For example, by balancing the number of switch transition, the integrated circuit provided herein may be capable of reducing or eliminating glitches or noise which may otherwise appear in the output signals when the number of switch transitions are unbalanced.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
an integrated circuit capable of controlling a first plurality of switches to generate a first output signal having a first amplitude and a second amplitude and a second plurality of switches to generate a second output signal having a third amplitude and said second amplitude, said integrated circuit is further capable of balancing the number of switch transitions of said first and second plurality of switches when said first and second output signals go from said first and third amplitudes to said second amplitude, respectively.

2. The apparatus of claim 1, wherein:
said balancing comprising controlling, by said integrated circuit, the switch transitions of said first plurality of switches to be approximately the same as the switch transitions of said second plurality of said switches.

3. The apparatus of claim 1, wherein:
said integrated circuit comprising decoder circuitry capable of generating respective control signals to control said conduction state of said first plurality of switches and said second plurality of switches.

4. The apparatus of claim 1, wherein:
said integrated circuit comprising a plurality of differential circuits, each said differential circuit comprising at least a first switch among said first plurality of switch, and a second switch among said second plurality of switches, and a current source, wherein said first output signal comprising the sum of the outputs of each said first switch of each said differential circuit and said second output signal comprising the sum of the outputs of each said second switch of each said differential circuit.

5. The apparatus of claim 4, wherein:
each said current source is equally weighted and produces approximately the same current value.

6. The apparatus of claim 1, wherein:
said balancing comprising controlling, by said integrated circuit, the switch transitions of said first plurality of switches to be equal to the switch transitions of said second plurality of said switches.

7. The apparatus of claim 1, wherein:
said integrated circuit is further capable of balancing the number of switch transitions of said first and second plurality of switches when said first output signal goes from said second amplitude to said first amplitude and said second output signal goes from said second amplitude to said third amplitude.

8. The apparatus of claim 1, wherein:
said first and second amplitudes comprise amplitudes correspond to at least one data transmission state, and said third amplitude corresponds to at least one idle state.

9. The apparatus of claim 8 wherein:
said idle state and said data transmission states each comprise a signal having an amplitude and wherein the amplitude of said idle state is between the amplitudes of said data transmission states.

10. The apparatus of claim 1, wherein:
said third amplitude is between said first and second amplitudes.

11. A system, comprising:
a circuit card comprising an integrated circuit capable of communicating in accordance with a plurality of different communication protocols, the circuit card being capable of being coupled to a bus, said integrated circuit further capable of controlling a first plurality of switches to generate a first output signal in accordance with at least one said communications protocol, said first output signal having a data transmission state and an idle state, and a second plurality of switches to generate a second output signal in accordance with at least one said communications protocol, said second output signal having a data transmission state and an idle state, said integrated circuit is further capable of balancing the number of switch transitions of said first and second plurality of switches when said first and second output signals go from said data transmission state to said idle state, respectively.

12. The system of claim 11, wherein:
said balancing comprising controlling, by said integrated circuit, the switch transitions of said first plurality of switches to be approximately the same as the switch transitions of said second plurality of said switches.

13. The system of claim 12, wherein:
said communications protocol is selected from the group consisting of a FC communications protocol, a SAS communications protocol, and a SATA communications protocol.

14. The system of claim 11, wherein:
said integrated circuit comprising decoder circuitry capable of generating respective control signals to control said conduction state of said first plurality of switches and said second plurality of switches.

15. The system of claim 11, wherein:
said integrated circuit comprising a plurality of differential circuits, each said differential circuit comprising at least a first switch among said first plurality of switch, and a second switch among said second plurality of switches, and a current source, wherein said first output signal comprising the sum of the outputs of each said first switch of each said differential circuit and said second output signal comprising the sum of the outputs of each said second switch of each said differential circuit.

16. The system of claim 15, wherein:
each said current source is equally weighted and produces approximately the same current value.

17. The system of claim 11, wherein:
said balancing comprising controlling, by said integrated circuit, the switch transitions of said first plurality of switches to be equal to the switch transitions of said second plurality of said switches.

18. The system of claim 11, wherein:
said integrated circuit is further capable of balancing the number of switch transitions of said first and second plurality of switches when said first and second output signals go from said idle state to said data transmission states, respectively.

19. An article comprising:
a storage medium having stored thereon instructions that when executed by a machine result in the following operations:
controlling, by an integrated circuit, a first plurality of switches to generate a first output signal having a first amplitude and a second amplitude and a second plurality of switches to generate a second output signal having a third amplitude and said second amplitude; and
balancing, by said integrated circuit, the number of switch transitions of said first and second plurality of switches when said first and second output signals go from said first and third amplitudes to said second amplitude, respectively.

20. The article of claim 19, wherein said instructions that when executed by said machine result in the following additional operations:
controlling, by said integrated circuit, the switch transitions of said first plurality of switches to be approximately the same as the switch transitions of said second plurality of said switches.

21. The article of claim 19, wherein said instructions that when executed by said machine result in the following additional operations:
generating, by said integrated circuit, respective control signals to control said conduction states of said first plurality of switches and said second plurality of switches.

22. The article of claim 19, wherein:
said integrated circuit comprising a plurality of differential circuits, each said differential circuit comprising at least a first switch among said first plurality of switch, and a second switch among said second plurality of switches, and a current source, wherein said first output signal comprising the sum of the outputs of each said first switch of each said differential circuit and said second output signal comprising the sum of the outputs of each said second switch of each said differential circuit.

23. The article of claim 22, wherein:
each said current source is equally weighted and produces approximately the same current value.

24. The article of claim 19, wherein said instructions that when executed by said machine result in the following additional operations:
controlling, by said integrated circuit, the switch transitions of said first plurality of switches to be equal to the switch transitions of said second plurality of said switches.

25. The article of claim 19, wherein said instructions that when executed by said machine result in the following additional operations:
balancing, by said integrated circuit, the number of switch transitions of said first and second plurality of switches when said first output signal goes from said second amplitude to said first amplitude and said second output signal goes from said second amplitude to said third amplitude.

26. The article of claim 19, wherein:
said first and second amplitudes comprise amplitudes correspond to at least one data transmission state, and said third amplitude corresponds to at least one idle state.

27. The article of claim 19, wherein:
said third amplitude is between said first and second amplitudes.

28. A method, comprising:
controlling, by an integrated circuit, a first plurality of switches to generate a first output signal having a first amplitude and a second amplitude and a second plurality of switches to generate a second output signal having a third amplitude and said second amplitude; and
balancing, by said integrated circuit, the number of switch transitions of said first and second plurality of switches when said first and second output signals go from said first and third amplitudes to said second amplitude, respectively.

29. The method of claim 28, further comprising:
controlling, by said integrated circuit, the switch transitions of said first plurality of switches to be approximately the same as the switch transitions of said second plurality of said switches.

30. The method of claim 28, further comprising:
generating, by said integrated circuit, respective control signals to control said conduction states of said first plurality of switches and said second plurality of switches.

31. The method of claim 28, wherein:
said integrated circuit comprising a plurality of differential circuits, each said differential circuit comprising at least a first switch among said first plurality of switch, and a second switch among said second plurality of switches, and a current source, wherein said first output signal comprising the sum of the outputs of each said first switch of each said differential circuit and said second output signal comprising the sum of the outputs of each said second switch of each said differential circuit.

32. The method of claim 31, wherein:
each said current source is equally weighted and produces approximately the same current value.

33. The method of claim 28, further comprising:
controlling, by said integrated circuit, the switch transitions of said first plurality of switches to be equal to the switch transitions of said second plurality of said switches.

34. The method of claim 28, further comprising:
balancing, by said integrated circuit, the number of switch transitions of said first and second plurality of switches when said first output signal goes from said second amplitude to said first amplitude and said second output signal goes from said second amplitude to said third amplitude.

35. The method of claim 28, wherein:
said first and second amplitudes comprise amplitudes correspond to at least one data transmission state, and said third amplitude corresponds to at least one idle state.

* * * * *

UNITED STATES PATENT AND TRADEMARK OFFICE
CERTIFICATE OF CORRECTION

PATENT NO. : 7,372,852 B2
APPLICATION NO. : 11/000020
DATED : May 13, 2008
INVENTOR(S) : Ghobadian It is certified that error appears in the above-identified patent and that said Letters Patent is hereby corrected as shown below:

Title Pg, Item (56), under "Other Publications", in column 2, line 6, after "1.0a" insert -- , --.

In column 9, line 57, in Claim 9, after "claim 8" insert -- , --.

Signed and Sealed this

Nineteenth Day of August, 2008

JON W. DUDAS
*Director of the United States Patent and Trademark Office*